(12) United States Patent
Maxwell et al.

(10) Patent No.: US 11,339,885 B1
(45) Date of Patent: May 24, 2022

(54) OXYGEN GENERATION CHECK VALVE DEVICE

(71) Applicant: O2 Air-Sea, LLC, Hillsboro, AL (US)

(72) Inventors: Johnny Maxwell, Hillsboro, AL (US); Mark Owens, Athens, AL (US)

(73) Assignee: O2 AIR-SEA, LLC, Hillsboro, AL (US)

( * ) Notice: Subject to any disclaimer, the term of this patent is extended or adjusted under 35 U.S.C. 154(b) by 0 days.

(21) Appl. No.: 17/194,691

(22) Filed: Mar. 8, 2021

(51) Int. Cl.
*F16K 17/04* (2006.01)

(52) U.S. Cl.
CPC ......... *F16K 17/04* (2013.01); *Y10T 137/7847* (2015.04); *Y10T 137/7848* (2015.04); *Y10T 137/7849* (2015.04)

(58) Field of Classification Search
CPC ......... Y10T 137/7847; Y10T 137/7848; Y10T 137/7849; F16K 47/10; F16K 15/026; F04B 39/1013; F04B 53/1025
USPC .................. 137/512, 513.3, 513.5, 513.7
See application file for complete search history.

(56) References Cited

U.S. PATENT DOCUMENTS

| | | | | |
|---|---|---|---|---|
| 626,064 A * | 5/1899 | Hobart | ................. | F16K 15/063 137/542 |
| 1,115,244 A * | 10/1914 | Reynolds | ................. | F16K 47/10 137/513.3 |
| 1,994,320 A * | 3/1935 | McLaughlin | ........ | F16K 17/082 137/514.5 |
| 2,318,962 A * | 5/1943 | Parker | ................. | F16K 15/026 137/514.5 |
| 2,508,015 A * | 5/1950 | Dexter | ................. | F16K 15/06 55/421 |
| 3,122,162 A * | 2/1964 | Sands | ................. | F16K 17/30 137/498 |
| 4,350,179 A * | 9/1982 | Bunn | ................. | F04B 39/1053 137/246.12 |
| 4,398,559 A * | 8/1983 | Bunn | ................. | F04B 39/1053 137/246.12 |
| 4,489,752 A * | 12/1984 | Deminski | ............. | F16K 15/025 137/512.1 |
| 4,872,481 A * | 10/1989 | Shaw | ................. | F16K 1/42 137/543.17 |
| 5,052,433 A * | 10/1991 | Levenez | ............. | F15B 11/068 137/513.3 |
| 5,190,446 A * | 3/1993 | Salter | ................. | F04B 7/0076 417/297 |
| 6,132,191 A * | 10/2000 | Hugenroth | ............ | F04C 29/126 137/220 |

(Continued)

*Primary Examiner* — Jessica Cahill
(74) *Attorney, Agent, or Firm* — Guice Patents PLLC (57) ABSTRACT

A gas check valve device having a header, at least one check valve plunger, at least one orifice that provides a first path for a small amount of gas to pass through the at least one check valve plunger when a respective compression spring presses the check valve plunger against a check valve seat to form an air tight seal, and a common gas passage connecting the check valve plunger with a common outlet. The gas check valve device provides a second path for a small amount of gas to pass through the orifice of the at least one check valve plunger in a reverse direction and a larger amount of the gas to pass between the at least one check valve plunger and the check valve seat when the gas pressure compresses the respective compression spring to separate the check valve plunger from the check valve seat.

20 Claims, 7 Drawing Sheets

(56) References Cited

U.S. PATENT DOCUMENTS

| | | | | |
|---|---|---|---|---|
| 6,230,734 B1* | 5/2001 | Grebnev | ............... | F16K 1/123 |
| | | | | 137/220 |
| 6,581,632 B2* | 6/2003 | Walpole | ............. | F04B 39/1053 |
| | | | | 137/512.1 |
| 6,932,109 B2* | 8/2005 | Thompson | ............ | F16K 17/082 |
| | | | | 137/269 |
| 10,662,935 B2* | 5/2020 | Hatch | ................ | F04B 39/1013 |
| 2010/0090149 A1* | 4/2010 | Thompson | ......... | F04B 39/1013 |
| | | | | 251/321 |

* cited by examiner

OXYGEN GENERATION CHECK VALVE DEVICE

BACKGROUND OF THE INVENTION

Field of the Invention

This invention relates to components and systems commonly used to concentrate gases that is used in a multitude of industries such as manufacturing, medical, environmental, hydroponics, and marine environments.

Description of the Related Art

Many industrial, health and environmental benefits are obtained through the utilization of highly purified or concentrated gases such as oxygen or nitrogen. The process of scrubbing oxygen or nitrogen from air is a mechanical effort and requires electro-mechanical components in order to do so. In order to concentrate oxygen, nitrogen and other gases as efficiently and cost effectively as possible has been a challenge and goal of institutions and industry for many decades. A common gas production method used to concentrate oxygen or nitrogen gas is a process called passive swing absorption, or PSA. PSA is a process whereby air, naturally containing approximately 20.9% oxygen, is compressed by a compressor before being piped/passed through a sieve bed of scrubbing media such as zeolite where the gas scrubbing media will capture and hold a particular component of the air mixture, while allowing the none targeted gas to pass through but a in higher concentrated form. Typical PSA systems require at least two sieve beds of media in them to provide a continuous flow of output gas such as oxygen whereby during the concentration process one of two sieve beds is absorbing nitrogen from the air stream and in doing so emitting a concentrated flow of high purity oxygen, at the same time the second sieve bed in the system would necessarily be in regeneration mode whereby nitrogen absorbed in the previous scrubbing mode cycle of operation has to be removed from the sieve media in order to reuse the media again. This is a process typically repeated over and over. In a two sieve bed PSA system, sieve bed #1 is scrubbing nitrogen from the air and in doing so sieve bed #1 is putting out concentrated oxygen. At the same time, sieve bed #1 is scrubbing nitrogen and putting concentrated oxygen out sieve bed #2 is in a regeneration cycle. The regeneration process is accomplished on the media, in sieve bed #2 by rapidly dropping the pressure on sieve bed #2's media while immediately following passing a small quantity of concentrated oxygen in reverse flow through the media bed of #2 to push out the nitrogen that has been scrubbed from the air stream prior. Passing air through an absorbent scrubbing media such as zeolite is an efficient method of capturing and temporarily holding the nitrogen molecules from the air as it is passed through the sieve bed of media. The scrubbing media works very well at absorbing gas such as nitrogen from the air stream until it becomes saturated with the selected gas, and until it can no longer efficiently absorb enough nitrogen in the process. When the nitrogen scrubbing media is at maximum saturation and is no longer capable of absorbing enough nitrogen from an air stream to output a highly concentrated flow of oxygen, the media must be regenerated.

At present most PSA systems utilize an assortment of controls, piping, compressors, check valves, solenoid valves, sieve beds of zeolite or other nitrogen absorbent media and piping systems configured so as to direct compressed air through sieve beds of gas absorbing media where nitrogen is scrubbed from the air stream. It is imperative in PSA based gas concentration systems to utilize a small amount of oxygen as a force to remove nitrogen in the regeneration mode of a PSA system. Nitrogen contained in a saturated scrubbing media sieve bed is released from the media by rapid pressure drop and then pushed out of the sieve bed in a reverse flow manner with the aid of a small scavenger quantity of oxygen flowing from another sieve bed that is actively scrubbing nitrogen from the air and as such is putting out concentrated oxygen. This regeneration process occurs on a timed basis or by utilizing an oxygen sensing control feature. Regeneration of the scrubbing media is necessary to prevent the oxygen output percentage from dropping below an acceptable level of concentration. It is impractical and not cost effective to use a scrubbing media such as zeolite for a one-time pass-through process whereby it has absorbed nitrogen to the point it can no longer scrub sufficient quantities and as such has to be discarded. Therefore, it is good business practice that in oxygen concentrating systems utilizing a PSA process that a regeneration process is implemented to prepare the absorbent media for multiple uses.

SUMMARY OF THE INVENTION

One primary objective of the present invention is to provide a header/housing system that can be manufactured out of metal or plastic materials, that has at least a set of check valves which are under compressed spring tension, in which each of the two check valves has a two-axis orifice passage through them so that oxygen concentration and nitrogen scrubbing of sieve beds can be carried out simultaneous and very efficiently while eliminating many of the solenoids and check valves required in most PSA systems. The two check valves have orifice holes sized whereby the orifice hole size can be calibrated by changing the hole diameter. It is the two-axis orifice design inherently part of the check valves used in this invention that allows for a very specific quantity of reverse flowing oxygen necessary for sieve bed scrubbing media regeneration. This inventions design allows for gas to flow in either of two directions in a header system without having to have as many check valves, electric solenoid valves, and piping as is used in traditional PSA systems. The orifice size used in this invention is sized depending on the sieve bed mass requiring regeneration, and the flow of oxygen required to aid in the removal of scrubbed nitrogen in the sieve. Orifice sizing also requires taking into account system operating pressures.

A further objective of the present invention is to provide for a check valve, reverse gas flow system that has less electromechanical components and as such it will allow for a PSA process that saves energy. This invention has all its components housed in a machined or molded single header/housing unit. The header/housing can be machined or molded using metal or plastic to meet the needs of the application. The header/housing is a component of the invention that holds the working pieces of the invention in their proper locations while serving as an integral part of the invention as well. This invention has connections ports at locations on the outside portion of the housing that allows for common connections to pipe or tubing. Connections can be threaded for pipe fittings or flange fittings or any piping or tubing connections configuration necessary for the application of use. This invention can be installed by connecting it to integral or external sieve bed and piping system. This invention can be premanufactured and installed on applications already using PSA gas absorbing system where precise flow characteristics are needed and where lower cost of manufacturing and ownership is desired. This inventions design and compact sizing, as compared to typical multiple external valve and controls component systems will provide for a faster and more efficient manufacturing of the end product PSA device or product and an easier installation. This invention is adaptable to work on a variety of gas concentrating systems. This inventions design allows for a more efficient and cost-effective solution and will provide lower maintenance and lifecycle cost for end users because it allows for a highly efficient PSA process while requiring less solenoids, valves, and piping used in conventional PSA systems.

A further objective of the present invention is to provide a reverse flow check valve system that can aid in the production or modification of highly efficient PSA systems while reducing the number of electrical components, electronic controls, or other hardware components typically found in gas concentrating systems and technologies.

DETAILED DESCRIPTION OF THE PREFERRED EMBODIMENT

FIGS. 1-10 illustrate a check valve device 100 that controls a flow of air, nitrogen, and oxygen from a scrubbing sieve bed and outputs oxygen. The check valve device 100 includes a header 8, at least one check valve plunger 20, 30, and at least one compression device 3a, 3b.

Figure 1:
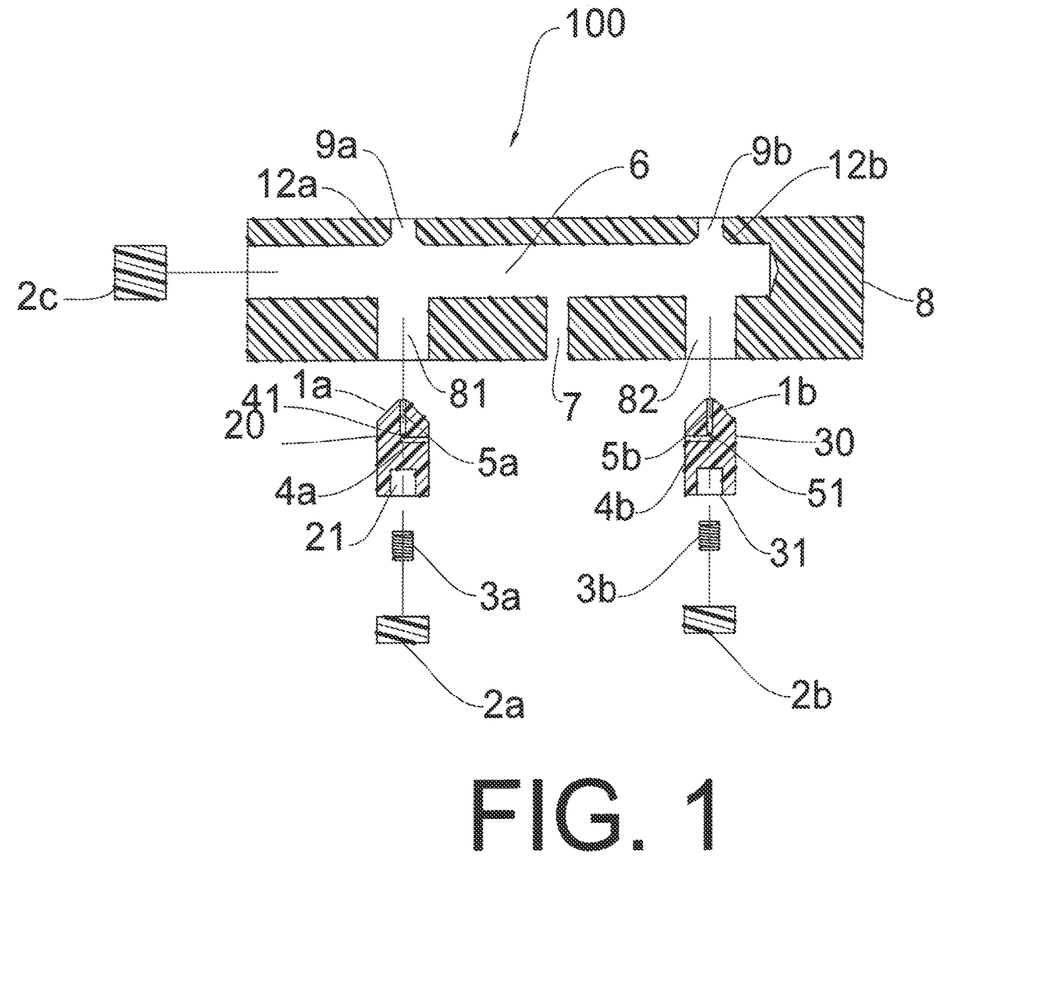
FIG. 1 is an exploded view of the present invention.
Figure 2A:
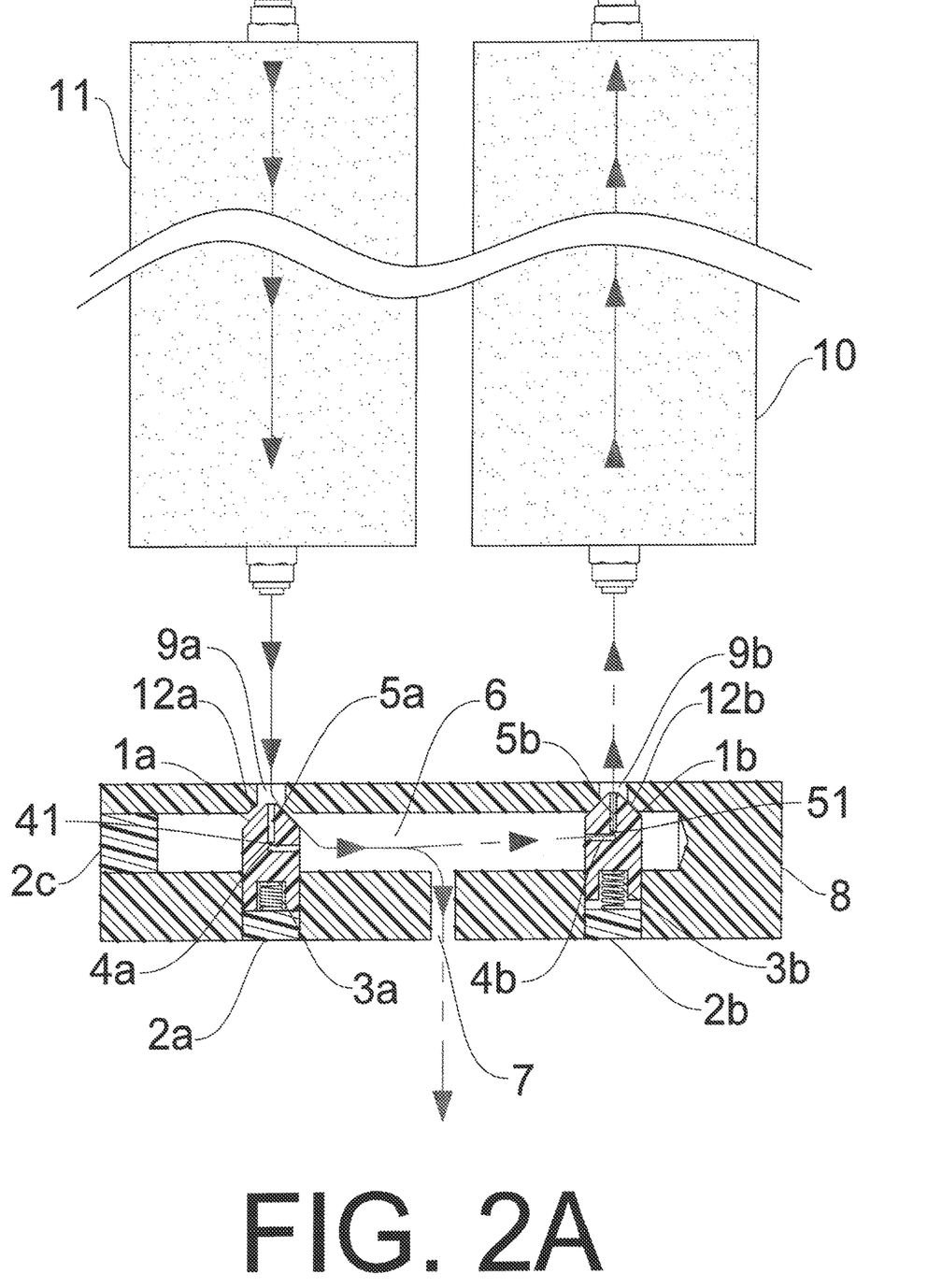
FIG. 2A is section view of the present invention with the check valves located in the first position.
Figure 2B:
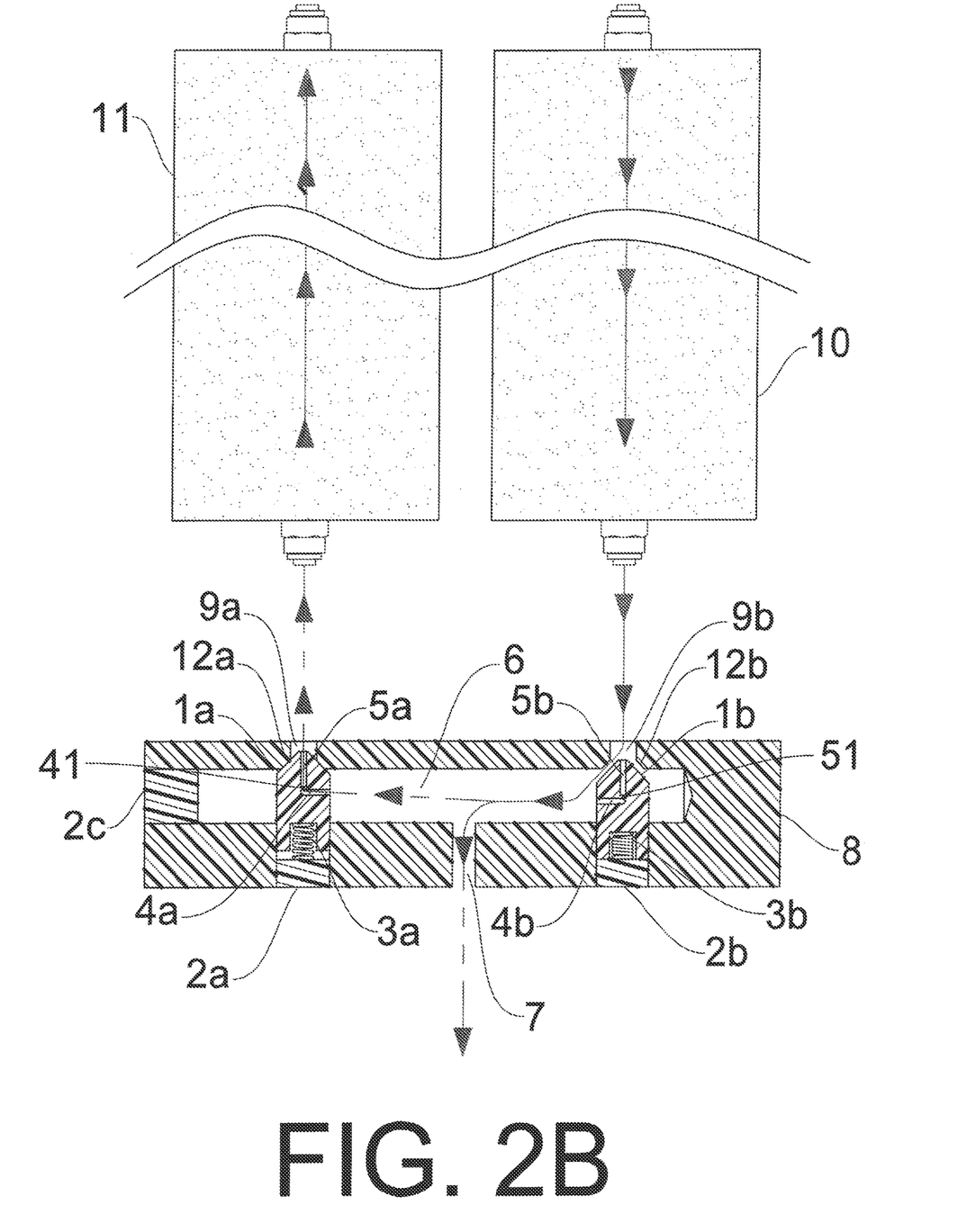
FIG. 2B is section view of the present invention with the check valves located in the second position.

The header 8 has an internal channel 6, at least one inlet-outlet port 9a, 9b, an outlet port 7, and at least one plunger port 81, 82. The header 8 can be integrally formed as a single component. The header 8 can be a housing, combined with a housing, integrally formed with a housing, or combined with a housing or other components. The header can have any exterior shape to meet the requirements of a specific application or system, including a shape selected from a square, a rectangle, a cylinder, a shape having at least three exterior sides or surfaces, and any combination thereof. The sides or surfaces can be flat, curved, or a combination thereof. The internal channel 6 is in direct communication with the at least one inlet-outlet port 9a, 9b, the outlet port 7, and the at least one plunger port 81, 82. The at least one inlet-outlet port 9a, 9b has a female seat 12a, 12b. A bottom portion of the at least one check valve plunger 20, 30 is located in the at least one plunger port 81, 82. The at least one compression device 3a, 3b pressing a male seat 1a, 1b of the at least one check valve plunger 20, 30 toward the female seat 12a, 12b of the at least one inlet-outlet port 9a, 9b. The male seat 1a, 1b of the at least one check valve plunger 20, 30 and the female seat 12a, 12b of the at least one inlet-outlet port 9a, 9b have a corresponding shape being a cone shape or tapered male and female seats or any other corresponding shape to form an air tight seal. The male seat 1a, 1b of the at least one check valve plunger 20, 30 and the female seat 12a, 12b of the at least one inlet-outlet port 9a, 9b form an air tight seal when they are respectively engaged.

The header 8, the at least one check valve plunger 20, 30, and the at least one compression device 3a, 3b of the check valve device 100 can be made from a material selected from a group consisting of plastic materials, resins, metallic materials, metallic alloys, medical grade plastic materials, medical grade resins, medical grade metallic materials, medical grade metallic alloys, any application specific materials, or any combination thereof. The plastic materials or plastics includes but is not limited to Polyethylene terephthalate (PETE or PET), Polyethylene (PE), Polyvinyl Chloride (PVC), Polypropylene (PP), Polystyrene (PS), Polylactic Acid (PLA), Polycarbonate (PC), Acrylic or Polymethyl Methacrylate (PMMA), Acrylonitrile-Butadiene-Styrene (ABS), Acetal (Polyoxymethylene, POM), and Nylon (PA).

The header 8 can also include at least one port plug 2a, 2b or another sealing device that is located in and seals an outer end of the at least one plunger port 81, 82 and defines an end of the at least one plunger port 81, 82. The at least one port plug 2a, 2b can include a protrusion, groove, hole, or seat to position the at least one compression device 3a, 3b. The at least one compression device 3a, 3b can be a compression spring or another device that presses the male seat 1a, 1b of the at least one check valve plunger 20, 30 toward the female seat 12a, 12b of the at least one inlet-outlet port 9a, 9b to form an air tight seal. The header 8 can also include at least one internal channel port plug 2c or another sealing device that is located in and seals an outer end of the internal channel 6 and defines an end of the internal channel 6.

Alternatively, the header 8 can be molded in multiple pieces including a top housing piece and a bottom housing piece. The pieces can be joined or welded together after the at least one check valve plunger 20, 30 and the at least one compression device 3a, 3b are positioned within the top housing piece and the bottom housing piece of the header 8. When the header is molded in multiple pieces the at least one port plug 2a, 2b and the at least one internal channel port plug 2c may not be required.

The at least one check valve plunger 20, 30 has at least one male seat 1a, 1b, at least one axial passage 5a, 5b, at least one crosswise passage 4a, 4b, and at least one orifice hole 41, 51. The at least one axial passage 5a, 5b, the at least one crosswise passage 4a, 4b, and the at least one orifice hole 41, 51 are formed in each said at least one check valve plunger 20, 30 when the at least one check valve plunger 20, 30 is molded or drilled into the at least one check valve plunger 20, 30. The at least one axial passage 5a, 5b extends axially into a top of the at least one check valve plunger 20, 30. The at least one crosswise passage 4a, 4b extends inwardly into a side of the at least one check valve plunger 20, 30. The at least one axial passage 5a, 5b and the at least one crosswise passage 4a, 4b extend into a middle portion of the at least one check valve plunger 20, 30 and are connected together by the at least one orifice hole 41, 51 located in the end of the at least one axial passage 5a, 5b so as to connect the at least one axial passage 5a, 5b with the one at least crosswise passage 4a, 4b. The at least one orifice hole 41, 51 can be sized to meter the flow of regeneration oxygen to provide the reverse flow of oxygen necessary to help purge nitrogen from the scrubbing sieve bed during the regeneration cycle of said scrubbing sieve bed. The at least one orifice hole 41, 51 has a diameter that is smaller than a diameter of the at least one axial passage 5a, 5b and is smaller than a diameter of the at least one crosswise passage 4a, 4b. The at least one axial passage 5a, 5b communicates with corresponding ones of the at least one inlet-outlet port 9a, 9b and the at least one crosswise passage 4a, 4b. The at least one crosswise passage 4a, 4b communicates with a corresponding one of the at least one orifice hole 41, 51, one of the at least one axial passage 5a, 5b, and the internal channel 6. The at least one male seat 1a, 1b is located on the top of the at least one check valve plunger 20, 30. The at least one check valve plunger 20, 30 can also include a corresponding base seat 21, 31 located on a bottom thereof. The at least one compression device 3a, 3b is located between the bottom of the at least one check valve plunger 20, 30 and an interior end of the at least one plunger port 81, 82 as defined by the at least one port plug 2a, 2b. Each of the at least one compression device 3a, 3b can have a first end located in the corresponding base seat 21, 31.

As illustrated in FIGS. 1, 2A, and 2B, the check valve device 100 includes the header 8, first check valve plunger 20, a second check valve plunger 30, a first compression device 3a, and a second compression device 3b.

The header 8 includes the internal channel 6, a first inlet-outlet port 9a having a first female seat 12a, a second inlet-outlet port 9b having a second female seat 12b, a first plunger port 81, a second plunger port 82, and an outlet port 7. The first inlet-outlet port 9a, the second inlet-outlet port 9b, the first plunger port 81, the second plunger port 82, and the outlet port 7 communicate with the internal channel 6. The first female seat 12a of the first inlet-outlet port 9a is located on an inner end of the first inlet-outlet port 9a and is located between the first inlet-outlet port 9a and the internal channel 6. The second female seat 12b of the second inlet-outlet port 9b is located on an inner end of the second inlet-outlet port 9b and is located between the second inlet-outlet port 9b and the internal channel 6. The first plunger port 81 and the second plunger port 82 are sealed on a respective outer end of the plunger port 81, 82. The outer ends of the first plunger port 81 and the second plunger port 82 communicate with an exterior of the header 8. The outer end of the first plunger port 81 can have a first port plug 2a or another sealing device that seals the outer end of the first plunger port 81 and defines an interior end of the first plunger port 81. The outer end of the second first plunger port 82 can have a second port plug 2b or another sealing device that seals the outer end of the second plunger port 82 and defines an interior end of the second plunger port 82.

Figure 3:
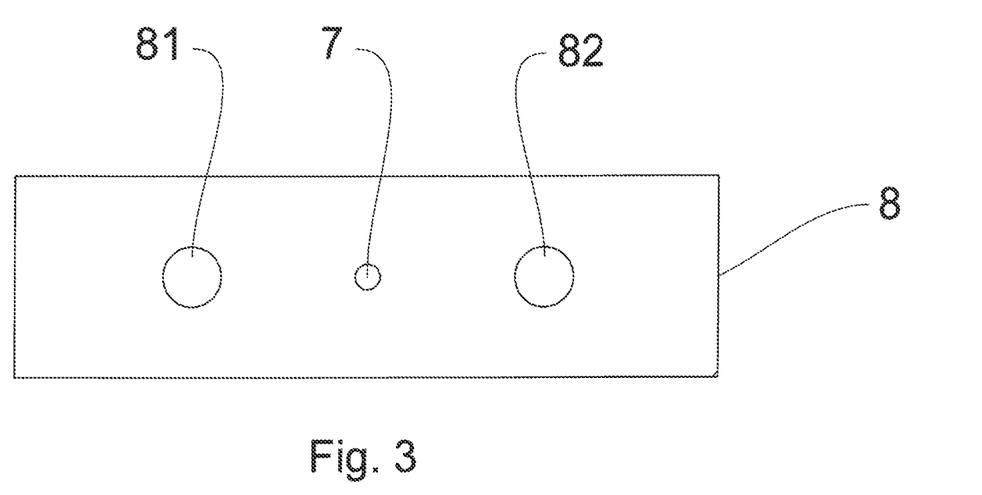
FIG. 3 is a front view of the header.
Figure 4:
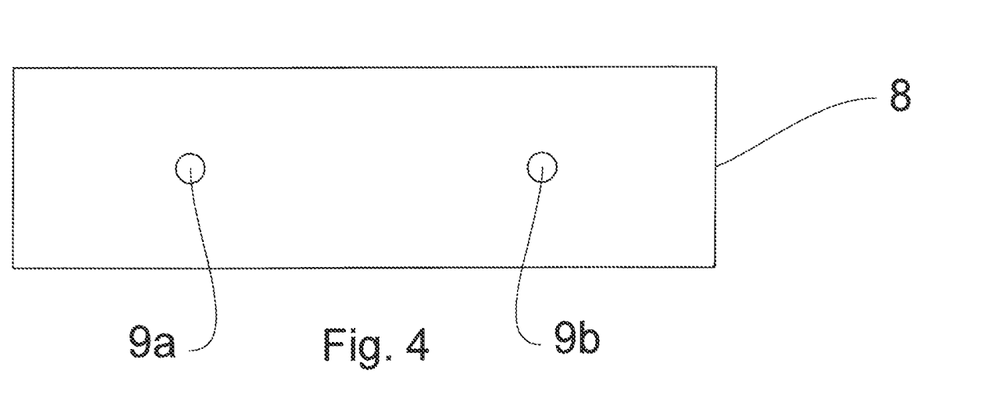
FIG. 4 is a rear view of the header.
Figure 5:
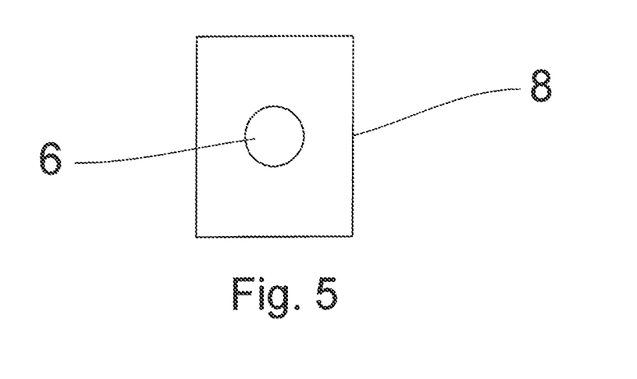
FIG. 5 is an end view of the header.
Figure 6:
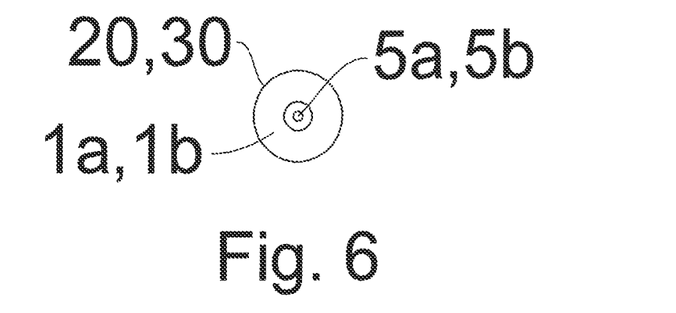
FIG. 6 is a top view of the check valve plunger.
Figure 7:
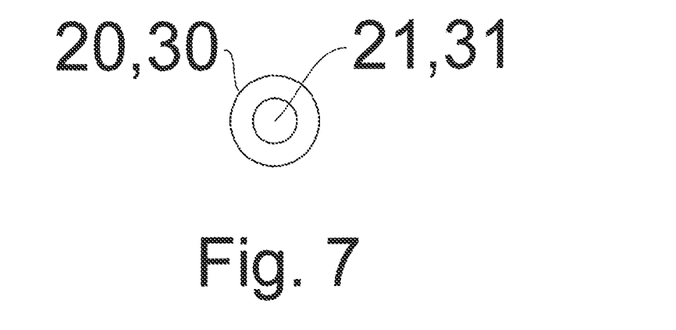
FIG. 7 is a bottom view of the check valve plunger.
Figure 8:
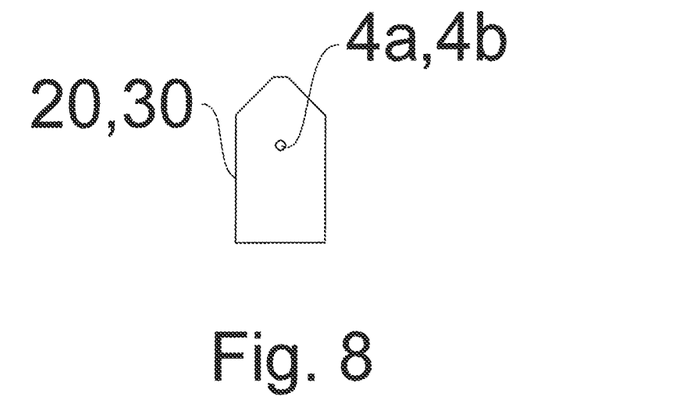
FIG. 8 is a side view of the check valve plunger.
Figure 9:
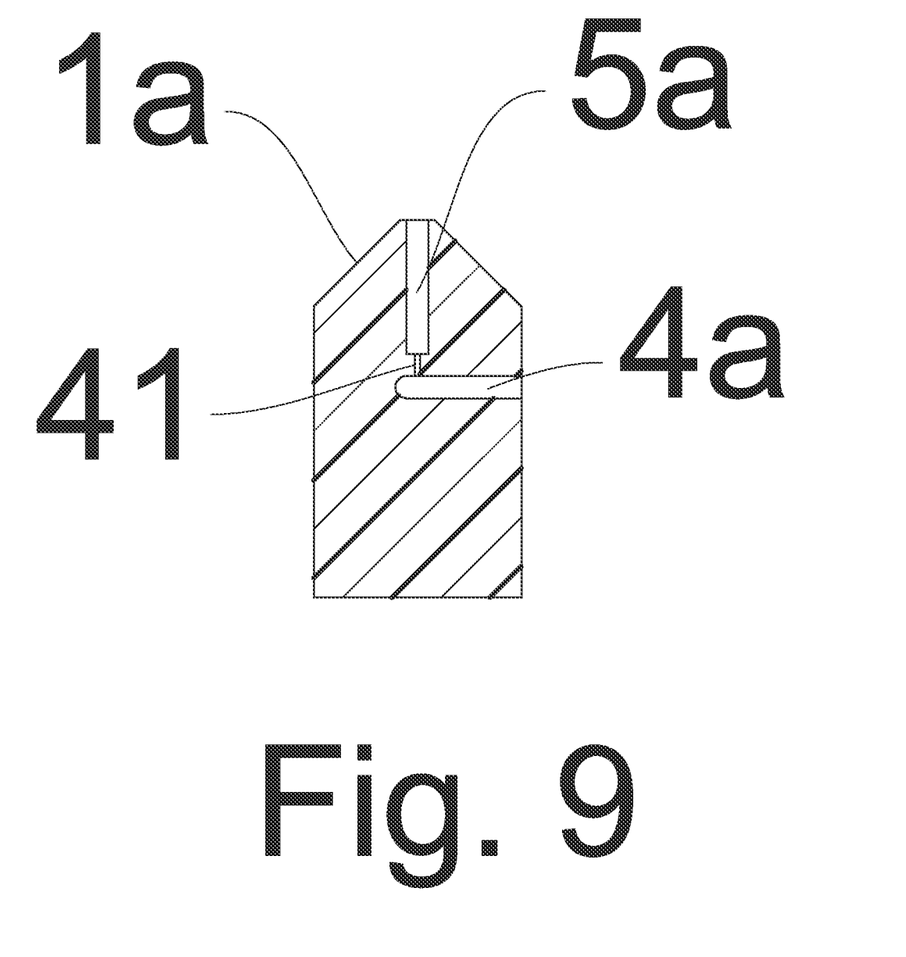
FIG. 9 is section view of the check valve plunger.
Figure 10:
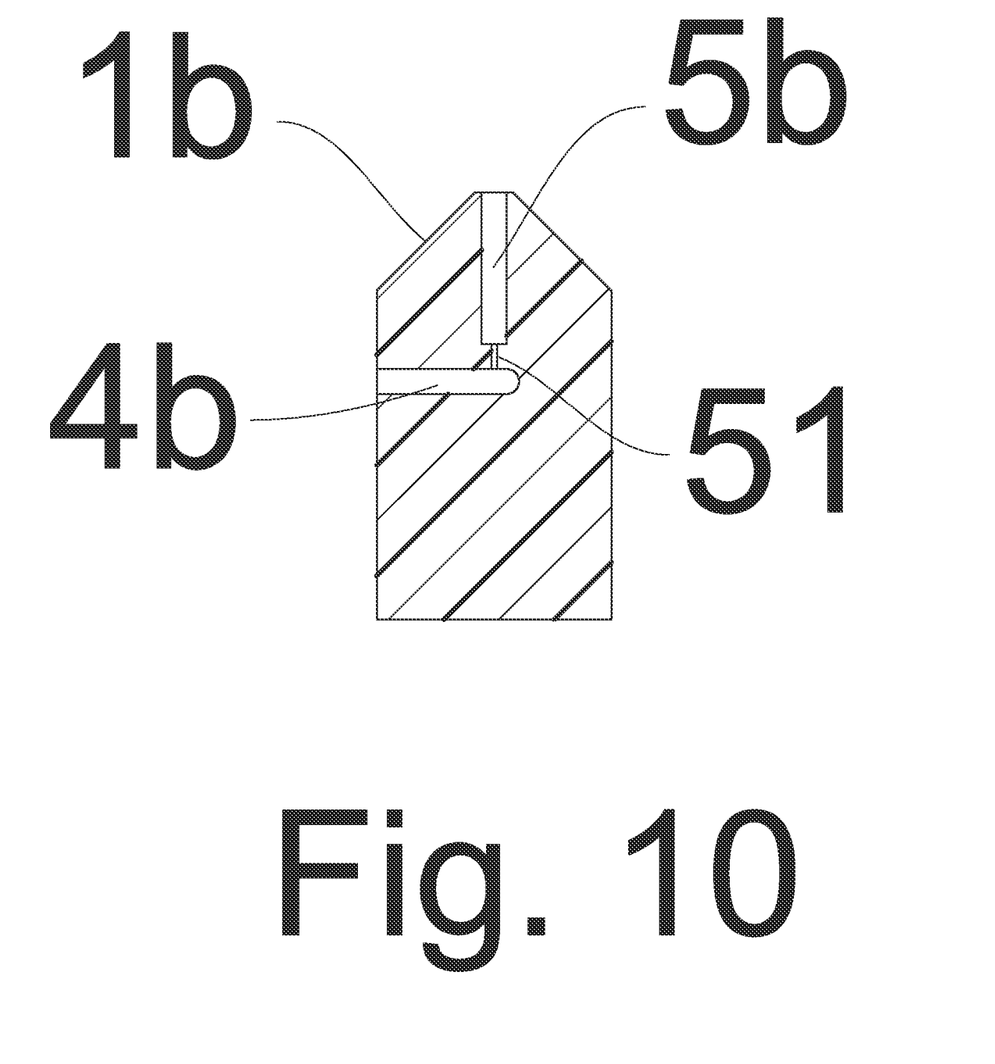
FIG. 10 is section view of the check valve plunger.

FIGS. 3-5 illustrate exterior views of the header, including a front view, a rear view, an end view, respectively.

In FIGS. 1, 2A, 2B, and 6-9, the first check valve plunger 20 has a first male seat 1a, a first axial passage 5a, a first crosswise passage 4a, a first orifice hole 41, and a first base seat 21. The first axial passage 5a extends axially into a top of the first check valve plunger 20. The first check valve plunger 20 has the first orifice hole 41 sized with a predetermined diameter or cross-sectional area to connect the first axial passage 5a and the first crosswise passage 4a. The flow of gas through the first check valve plunger 20 is limited by the predetermined diameter or cross-sectional area of the first orifice hole 41. The first crosswise passage 4a extends inwardly into a side of the first check valve plunger 20. The first axial passage 5a and the first crosswise passage 4a meet in a middle portion of the first check valve plunger 20 and are connected together by the first orifice hole 41 located in the end of the axial passage 5a to connect the axial passage 5a with the crosswise passage 4a. The first axial passage 5a communicates with the first inlet-outlet port 9a and the first crosswise passage 4a and the first orifice hole 41. The first crosswise passage 4a communicates with the first axial passage 5a via the first orifice hole 41 and the internal channel 6. The first male seat 1a is located on the top of the first check valve plunger 20. The first male seat 1a of the first check valve plunger 20 and the first female seat 12a of the first inlet-outlet port 9a can have corresponding cone shaped male and female seats to provide an air tight seal. The first check valve plunger 20 can also include a first base seat 21 located on a bottom thereof. The first compression device 3a is located between the bottom of the first check valve plunger 20 and the interior end of the first plunger port 81 as defined by the first port plug 2a. The first compression device 3a can have a first end located in the first base seat 21.

In FIGS. 1, 2A, 2B, 6-8, and 10, the second check valve plunger 20 has a second male seat 1a, a second axial passage 5b, a second orifice hole 51, a second crosswise passage 4b, and a second base seat 31. The second axial passage 5b extends axially into a top of the second check valve plunger 30. The second crosswise passage 4b extends inwardly into a side of the second check valve plunger 30. The second axial passage 5b and the second crosswise passage 4b meet in a middle portion of the second check valve plunger 30 and are connected together by the second orifice hole 51 sized with a predetermined diameter or cross-sectional area to connect the second axial passage 5b and the second crosswise passage 4b. The flow of gas through the second check valve plunger 30 is limited by the predetermined diameter or cross-sectional area of the second orifice hole 51. The second axial passage 5b communicates with the second inlet-outlet port 9b and the second orifice hole 51 and the second crosswise passage 4b. The second crosswise passage 4b communicates with the second axial passage 5b via the second orifice hole 51 and the internal channel 6. The second male seat 1b is located on the top of the second check valve plunger 30. The second male seat 1b of the second check valve plunger 30 and the second female seat 12b of the second inlet-outlet port 9b can have corresponding cone shaped male and female seats to provide an air tight seal. The second check valve plunger 30 can also include a second base seat 31 located on a bottom thereof. The second compression device 3b is located between the bottom of the second check valve plunger 30 and the interior end of the second plunger port 82 as defined by the second port plug 2b. The second compression device 3b can have a first end located in the second base seat 31.

The first compression device 3a can be a first compression spring 3a or another device that presses the first male seat 1a of the first check valve plunger 20 toward the first female seat 12a of the first inlet-outlet port 9a to form an air tight seal. The second compression device 3b can be a second compression spring 3b or another device that presses the second male seat 1b of the second check valve plunger 30 toward the second female seat 12b of the second inlet-outlet port 9b to form an air tight seal.

FIGS. 2A and 2B illustrate the check valve device 100 being used with a first scrubbing sieve bed 11 and a second scrubbing sieve bed 10. The check valve device 100 is an oxygen concentrating check valve device. The second check valve plunger 30 is located on an opposite side of the header or spaced apart from the first check valve plunger 20. The first check valve plunger 20, the second check valve plunger 30, the first compression spring 3a, and the second compression spring 3b are held in position by the housing 8.

In FIG. 2A, the check valve device 100 is located in a first position. When the check valve device 100 is located in the first position, the first check valve plunger 20 is located in a closed position until a pressure from the gas flowing from the scrubbing sieve bed 11 exerts a great enough pressure or force to unseat the check valve plunger and move the first check valve plunger 20 to an open position and the second check valve plunger 30 is located in a closed position.

In FIG. 2A, when the first check valve plunger 20 is forced into the open position from the pressure of the gas flowing from the scrubbing sieve bed 11, a pressurized gas or oxygen flowing from the first scrubbing sieve bed 11 enters the header 8 through the first inlet-outlet port 9a and because of the pressure of the gas exerted against the first check valve plunger 20 in sufficient force to overcome the first compression spring 3a that is providing a specific calibrated pressure against the bottom of the first check valve plunger 20. The spring pressure being exerted by the first compression spring 3a on the bottom of the first check valve plunger 20 is in an axial direction and forces the first male seat 1a of the first check valve plunger 20 toward the first female seat 12a of the first inlet-outlet port 9a. The first compression spring 3a is compressed and held in position by the first port plug 2a located on a bottom of the first compression spring 3a and as such the flow and force of a gas from the first scrubbing sieve bed 11 must have enough pressure or force to overcome the spring pressure behind the first check valve plunger 20. When a sufficient pressure and force of the gas or oxygen from the first scrubbing sieve bed 11 has been applied to the first male seat 1a of the first check valve plunger 20, the pressure and force of the gas flowing into first inlet-outlet port 9a pushes the first male seat 1a of the first check valve plunger 20 away from the first female seat 12a, and the first male seat 1a and the first female seat 12a are separated by a gap and the gas or oxygen flows between the first male seat 1a and the first female seat 12a into the internal channel 6. Some of the gas flowing from the first inlet-outlet port 9a flows through the first axial passage 5a, the first orifice hole 41 and the first crosswise passage 4a and through the internal channel 6. The amount of gas flowing between the first male seat 1a and the first female seat 12a is a quantity that is greater than a quantity flowing through the first axial passage 5a, the first orifice hole 41 and the first crosswise passage 4a.

In FIG. 2A, the quantity of gas flow is in direct proportion to a width of the gap created when the gas or oxygen pressure overcomes the spring pressure and forces the first male seat 1a to separate from the first female seat 12a. The gas or oxygen from the first scrubbing sieve bed 11 passes between the male tapered ends of the first male seat 1a and the first female seat 12a that have been machined or molded to create tapered seats for the first male seat 1a of the first check valve plunger 20 and the first female seat 12a of the first inlet-outlet port 9a. The gas that has passed between the first male seat 1a and the first female seat 12a and through the first axial passage 5a, the first orifice hole 41 and the first crosswise passage 4a of the first check valve plunger 20 will then travel through the internal channel 6 before exiting out of the outlet port 7 with a smaller amount moving through the second check valve plunger 30 and out of the second inlet-outlet port 9b. The gas passing through the second check valve plunger 30 will pass through the second crosswise passage 4b, the second orifice hole 51, and the second axial passage 5b. The gas discharged from the second inlet-outlet port 9b will flow through the second scrubbing sieve bed 10 at a lower pressure to aid in the media located in the second scrubbing sieve bed 10 being regenerated. The gas flowing into the header 8 through the first inlet-outlet port 9a and out of the outlet port 7 and the second inlet-outlet port 9b will be an oxygen enriched gas or air having a higher oxygen level as a result of scrubbing process of the scrubbing media in the first scrubbing sieve bed 11.

In FIG. 2A, when the second check valve plunger 30 is located in a closed position, the second male seat 1b of the second check valve plunger 30 is pressed tightly against the second female seat 12b by the second compression spring 3b that is located below the second check valve plunger 30. In order to accomplish a scrubbing media regeneration process in a sieve bed such as a second scrubbing sieve bed 10, the sieve bed to be regenerated must vent to the atmosphere or a low pressure collection chamber via the utilization of solenoid valves or other venting means. During the regeneration process there should be no pressure being imposed against the second male seat 1b of the second check valve plunger 30 coming from the second inlet-outlet port 9b that is closest to the second scrubbing sieve bed 10. As such there is no pressure to unseat the second male seat 1b from the second female seat 12b by overcoming the spring pressure imposed by the second compression spring 3b.

In FIG. 2A, when the check valve device 100 is located in a first position, this invention also allows a small calibrated volume of gas or oxygen to pass from the internal channel 6 to be used in a regeneration process for a saturated scrubbing sieve bed, which is the second scrubbing sieve bed 10. Because the gas or oxygen is under pressure, it will flow through the internal channel 6, and then it will flow out of the outlet port 7 and a smaller calibrated quantity of the gas or oxygen will flow through the second crosswise passage 4b and the second orifice hole 51 and the second axial passage 5b of the second check valve plunger 30, while the second check valve plunger 30 is located in the closed or checked position. The smaller calibrated portion of regeneration gas or oxygen after passing through the second check valve plunger 30 then exits the second axial passage 5b located at the top of the second check valve plunger 30, located adjacent to the tapered coned end of the second male seat 1b, and out through the second inlet-outlet port 9b where the gas or oxygen then flows via a user supplied piping or tubing or other connective method into a sieve bed being regenerated such as the second scrubbing sieve bed 10. This smaller calibrated portion of regeneration gas or oxygen travels through the second scrubbing sieve bed 10 in a direction away from the header 8 at a lower pressure. Whereas, during the nitrogen scrubbing cycle of the process, the gas or oxygen flows through the first scrubbing sieve bed 11 in a direction toward the header 8 at a higher pressure.

In FIG. 2B, the check valve device 100 is located in a second position. When the check valve device 100 is located in the second position, the first check valve plunger 20 is located in a closed position and the second check valve plunger 30 is located in an open position.

In FIG. 2B, when the second check valve plunger 30 is located in an open position, a pressurized gas or oxygen flowing from the second scrubbing sieve bed 10 enters the header 8 through the second inlet-outlet port 9b and provides enough force to overcome the second compression spring 3b that is providing a specific calibrated pressure against the bottom of the second check valve plunger 30. The spring pressure being exerted by the second compression spring 3b on the bottom of the second check valve plunger 30 is in an axial direction and forces the second male seat 1b of the second check valve plunger 30 toward the second female seat 12b of the second inlet-outlet port 9b. The second compression spring 3b is compressed and held in position by the second port plug 2*b* located on a bottom of the second compression spring 3*b* and as such the flow and force of a gas from the second scrubbing sieve bed 10 must have enough pressure or force to overcome the spring pressure behind the second check valve plunger 30. When a sufficient pressure and force of the gas or oxygen from the second scrubbing sieve bed 10 has been applied to the second male seat 1*b* of the second check valve plunger 30, the pressure and force of the gas flowing into second inlet-outlet port 9*b* pushes the second male seat 1*b* of the second check valve plunger 30 away from the second female seat 12*b*, and the second male seat 1*b* and the second female seat 12*b* are separated by a gap and the gas or oxygen flows between the second male seat 1*b* and the second female seat 12*b* into the internal channel 6. Some of the gas flowing from the second inlet-outlet port 9*b* flows through the second axial passage 5*b*, the second orifice hole 51 and the second crosswise passage 4*b* and through the internal channel 6. The amount of gas flowing between the second male seat 1*b* and the second female seat 12*b* is a quantity that is greater than a quantity flowing through the second axial passage 5*b*, the second orifice hole 51 and the second crosswise passage 4*b*.

In FIG. 2B, the quantity of gas flow is in direct proportion to a width of the gap created when the gas or oxygen pressure overcomes the spring pressure and forces the second male seat 1*b* to separate from the second female seat 12*b*. The gas or oxygen from the second scrubbing sieve bed 10 passes between the male tapered ends of the second male seat 1*b* and the second female seat 12*b* that have been machined or molded to create tapered seats for the second male seat 1*b* of the second check valve plunger 30 and the second female seat 12*b* of the second inlet-outlet port 9*b*. The gas or oxygen that has passed between the second male seat 1*b* and the second female seat 12*b* and through the second axial passage 5*b*, the second orifice hole 51 and the second crosswise passage 4*b* of the second check valve plunger 30 will then travel through the internal channel 6 before exiting out of the outlet port 7 with a smaller amount moving through the first check valve plunger 20 and out of the first inlet-outlet port 9*a*. The gas passing through the first check valve plunger 20 will pass through the second crosswise passage 4*a*, the second orifice hole 41, and the second axial passage 5*a*. The gas discharged from the first inlet-outlet port 9*a* will flow through the first scrubbing sieve bed 11 at a lower pressure to aid in the media located in the first scrubbing sieve bed 11 being regenerated. The gas flowing into the header 8 through the second inlet-outlet port 9*b* and out of the outlet port 7 and the first inlet-outlet port 9*a* will be the oxygen enriched gas or air having a higher oxygen level as a result of scrubbing process of the scrubbing media in the second scrubbing sieve bed 10.

In FIG. 2B, when the first check valve plunger 20 is located in a closed position, the first male seat 1*a* of the first check valve plunger 20 is pressed tightly against the first female seat 12*a* by the first compression spring 3*a* that is located below the first check valve plunger 20. In order to accomplish a scrubbing media regeneration process in a sieve bed such as a first scrubbing sieve bed 11, the sieve bed to be regenerated must vent to the atmosphere or a low pressure collection chamber via the utilization of solenoid valves or other venting means. During the regeneration process there should be no pressure being imposed against the first male seat 1*a* of the first check valve plunger 20 coming from the first inlet-outlet port 9*a* that is closest to the first scrubbing sieve bed 11. As such there is no pressure to unseat the first male seat 1*a* from the first female seat 12*a* by overcoming the spring pressure imposed by the first compression spring 3*a*.

In FIG. 2B, when the check valve device 100 is located in a second position, this invention also allows a small calibrated volume of gas or oxygen to pass from the internal channel 6 to be used in a regeneration process for a saturated scrubbing sieve bed, which is the first scrubbing sieve bed 11. Because the gas or oxygen is under pressure, it will flow through the internal channel 6, and then it will flow out of the outlet port 7 and a smaller calibrated quantity of the gas or oxygen will flow through the first crosswise passage 4*a* and the first orifice hole 41 and the first axial passage 5*a* of the first check valve plunger 20, while the first check valve plunger 20 is located in the closed or checked position. The smaller calibrated portion of regeneration gas or oxygen after passing through the first check valve plunger 20 then exits the first axial passage 5*a* located at the top of the first check valve plunger 20, located adjacent to the tapered coned end of the first male seat 1*a*, and out through the first inlet-outlet port 9*a* where the gas or oxygen then flows via a user supplied piping or tubing or other connective method into a sieve bed being regenerated such as the first scrubbing sieve bed 11. This smaller calibrated portion of regeneration gas or oxygen travels through the first scrubbing sieve bed 11 in a direction away from the header 8 at a lower pressure. Whereas, during the nitrogen scrubbing cycle of the process, the gas or oxygen flows through the second scrubbing sieve bed 10 in a direction toward the header 8 at a higher pressure.

The header 8 can be a housing, combined with a housing, integrally formed with a housing, or combined with a housing or other component and have any exterior shape to meet the requirements of a specific application or system. The first inlet-outlet port 9*a*, the second inlet-outlet port 9*b*, the first plunger port 81, the second plunger port 82, and the outlet port 7 communicate with the internal channel 6. The first plunger port 81 corresponds with the first inlet-outlet port 9*a*, and the second plunger port 82 corresponds with the second inlet-outlet port 9*b*. For illustration purposes, the first inlet-outlet port 9*a* and the second inlet-outlet port 9*b* are located on an opposite side of the header 8 from the outlet port 7. In used the first inlet-outlet port 9*a* and the second inlet-outlet port 9*b* can be located on a same side or surface of the header 8 or different sides or surfaces of the header, or a combination thereof. The first inlet-outlet port 9*a*, the second inlet-outlet port 9*b*, and the outlet port 7 can be located on the same side or surface of the header 8, different sides or surfaces of the header, or a combination thereof. The first inlet-outlet port 9*a*, the second inlet-outlet port 9*b*, and the outlet port 7 can be located three different sides or surfaces of the housing.

The oxygen concentration check valve device includes at least a pair of check valve plungers 20, 30 with male tapered seats 1*a*, 1*b*, installation access port plugs 2*a*, 2*b*, 2*c*, compression springs 3*a*, 3*b* to provide a predetermined pressure or calibrated force to the bottom of the check valve plungers 20, 30 in order to form an air tight seal between the male seats 1*a*, 1*b* of the at least one check valve plunger 20, 30 and the female seats 12*a*, 12*b* of the at least one inlet-outlet port 9*a*, 9*b*, orifices 4*a*, 5*a*, 4*b*, 5*b* located perpendicular and linear to the male seats 1*a*, 1*b* of the check valve plungers 20, 30 that are tapered ends and are accepted in the female seats 12*a*, 12*b* of the inlet-outlet ports 9*a*, 9*b*, and the outlet port 7. The inlet-outlet ports 9*a*, 9*b* are gas or oxygen passageways connected to the internal channel 6 and communicating with the outlet port 7 that is connected to the internal channel 6. The header 8 holds the at least one valve plunger 20, 30 and the at least one compression device 3a, 3b into a single compact device. The male seat 1a, 1b of the at least one check valve plunger 20, 30 and the female seat 12a, 12b of the at least one inlet-outlet port 9a, 9b have a corresponding shape being a cone shape or tapered male and female seats or any other corresponding shape to form an air tight seal. The shape and configuration of the male seats 1a, 1b of the at least one check valve plunger 20, 30 and the female seats 12a, 12b of the at least one inlet-outlet port 9a, 9b can be reversed and/or inverted.

This check valve invention can operate at high quantity flow or low quantity flow and it can operate at low pressure or high pressures by selecting appropriate springs with the tension needed for the desired pressure range.

This check valve invention can be an integrally installed component in a premanufactured application or it can be installed as a portable add on in the field.

For purposes of discussion and illustration only and not part of the patent claims, the scrubbing sieve beds are shown as 10 and 11 in FIGS. 2A and 2B are included for clarity to help illustrate the flow of air and oxygen through the oxygen concentrating check valve system as well as the seat position of the check valves. No claims are made about the sieve beds in this invention as the sieve beds are not part or portion therein.

The invention claimed is:

1. A check valve device comprising:
a header and at least one check valve plunger;
the header has an internal channel, at least two inlet-outlet ports, and an outlet port located therein, the outlet port and the two inlet-outlet ports communicating with the internal channel, at least one inlet-outlet port of the at least two inlet-outlet ports has a female seat;
each said at least one check valve plunger has a male seat, an axial passage, a crosswise passage, and an orifice hole, the male seat is located on a top of the at least one check valve plunger, the female seat and the male seat have a corresponding shape and form an air tight seal when the female seat and the male seat are respectively engaged, the axial passage extends axially into a top of the at least one check valve plunger, the crosswise passage extends inwardly into a side of the at least one check valve plunger, the axial passage and the crosswise passage extend into a middle portion of the at least one check valve plunger, the orifice hole connects the axial passage to the crosswise passage;
wherein the at least one orifice hole has a diameter that is smaller than a diameter of the at least one axial passage and that is smaller than a diameter of the at least one crosswise passage.

2. The check valve device according to claim 1, wherein the orifice hole has a predetermined cross section that limits a flow of regeneration oxygen.

3. The check valve device according to claim 1, wherein the corresponding shape of the at least one female seat and the at least one male seat is selected from a group of shapes selected from a cone shape and a tapered shape.

4. The check valve device according to claim 1, wherein the axial passage, the crosswise passage, and the orifice hole of each said at least one check valve plunger is formed when each said at least one check valve plunger molded, drilled or a combination thereof.

5. The check valve device according to claim 1, wherein the orifice hole of each said at least one check valve plunger has a cross section sized to calibrate and limit an amount of compressed air the flows through the at least one check valve plunger.

6. The check valve device according to claim 1, wherein the at least two inlet-outlet ports of the header include a first inlet-outlet port and a second inlet-outlet port, the first inlet-outlet port, the second inlet-outlet port, and the outlet port are located in a surface of the header selected from a group consisting of a same surface, and at least two different surfaces.

7. The check valve device according to claim 1, further comprising at least one compression device,
wherein the header has at least one plunger port, a bottom portion of the at least one check valve plunger is located in the at least one plunger port, the at least one compression device is located in the at least one plunger port below the at least one check valve plunger, the at least one compression device pressing the at least one check valve plunger toward a corresponding inlet-outlet port of the at least two inlet-outlet ports.

8. The check valve device according to claim 7, wherein the at least one check valve plunger has a corresponding base seat located on a bottom thereof, the at least one compression device has an end located in the corresponding base seat.

9. The check valve device according to claim 1, wherein the header is made from a material selected from a group consisting of plastic materials, resins, metallic materials, metallic alloys, medical grade plastic materials, medical grade resins, medical grade metallic materials, medical grade metallic alloys, or any combination thereof.

10. The check valve device according to claim 1, wherein each inlet-outlet port of the at least two inlet-outlet ports allows for multi-directional air flow into and out of the header and the outlet port allows for a unidirectional air flow out of the header.

11. A check valve device comprising:
a header and at least one check valve plunger;
the header has an internal channel, at least one inlet-outlet port, and an outlet port, the at least one inlet-outlet port has a female seat;
each said at least one check valve plunger has a male seat, an axial passage, a crosswise passage, and an orifice hole, the male seat is located on a top of the at least one check valve plunger, the female seat and the male seat have a corresponding shape and form an air tight seal when the female seat and the male seat are respectively engaged, the axial passage extends axially into a top of the at least one check valve plunger, the crosswise passage extends inwardly into a side of the at least one check valve plunger, the axial passage and the crosswise passage extend into a middle portion of the at least one check valve plunger, the orifice hole connects the axial passage to the crosswise passage;
wherein the header has at least one port plug inserted into an outer end of at least one plunger port to create an air tight seal and to define an end of the at least one plunger port, and at least one internal channel port plug inserted into an outer end of the internal channel to create an air tight seal and to define an end of the internal channel.

12. A check valve device comprising:
a header and at least one check valve plunger;
the header has an internal channel, at least two inlet-outlet ports, and an outlet port located therein, the outlet port and the two inlet-outlet ports communicating with the internal channel, at least one inlet-outlet port of the at least two inlet-outlet ports has a female seat; and at least one compression device;

wherein each said at least one check valve plunger has a male seat, an axial passage, a crosswise passage, and an orifice hole, the male seat is located on a top of the at least one check valve plunger, the female seat and the male seat have a corresponding shape and form an air tight seal when the female seat and the male seat are respectively engaged, the axial passage extends axially into a top of the at least one check valve plunger, the crosswise passage extends inwardly into a side of the at least one check valve plunger, the axial passage and the crosswise passage extend into a middle portion of the at least one check valve plunger, the orifice hole connects the axial passage to the crosswise passage;

wherein the header has at least one plunger port, a bottom portion of the at least one check valve plunger is located in the at least one plunger port, the at least one compression device is located in the at least one plunger port below the at least one check valve plunger, the at least one compression device pressing the at least one check valve plunger toward a corresponding inlet-outlet port of the at least two inlet-outlet ports;

wherein the at least two inlet-outlet ports of the header includes a first inlet-outlet port having a first female seat and a second inlet-outlet port having a second female seat;

wherein the at least one check valve plunger includes a first check valve plunger and a second check valve plunger, the first check valve plunger has a first male seat, a first axial passage, a first crosswise passage, a first orifice hole, and a first base seat, and the second check valve plunger has a second male seat, a second axial passage, a second crosswise passage, a second orifice hole, and a second base seat; and wherein the at least one compression device includes a first compression spring and a second compression spring, the first check valve plunger is located between the first compression spring and the first inlet-outlet port, the first compression spring presses the first male seat of the first check valve plunger toward the first female seat of the first inlet-outlet port, the second check valve plunger is located between the second compression spring and the second inlet-outlet port, the second compression spring presses the second male seat of the second check valve plunger toward the second female seat of the second inlet-outlet port.

13. The check valve device according to claim 12, wherein the check valve device is moveable between a first position and a second position by a force from a compressed air;

wherein, when the check valve device is located in the first position, the first check valve plunger is located in an open position and the second check valve plunger is located in a closed position, when the first check valve plunger is located in the open position, the force from the compressed air enters the header through the first inlet-outlet port presses the first check valve plunger downward and compresses the first compression spring, when the second check valve plunger is located in the closed position, the second compression spring presses the second male seat of the second check valve plunger against the second female seat, the first male seat of the first check valve plunger is separated from the first female seat, the compressed air flows from the first inlet-outlet port between the first male seat and the first female seat and through the first axial passage, the first orifice hole and the first crosswise passage into the internal channel, the compressed air flows from the internal channel through the outlet port and through the second crosswise passage, the second orifice hole, and the second axial passage of the second check valve plunger through the second inlet-outlet port;

wherein, when the check valve device is located in the second position, the first check valve plunger is located in a closed position and the second check valve plunger is located in an open position, when the second check valve plunger is located in the open position, the force from the compressed air enters the header through the second inlet-outlet port presses the second check valve plunger downward and compresses the second compression spring, when the first check valve plunger is located in the closed position, the first compression spring presses the first male seat of the first check valve plunger against the first female seat, the second male seat of the second check valve plunger is separated from the second female seat, the compressed air flows from the second inlet-outlet port between the second male seat and the second female seat and through the second axial passage, the second orifice hole and the second crosswise passage into the internal channel, the compressed air flows from the internal channel through the outlet port and through the first crosswise passage, the first orifice hole, and the first axial passage of the first check valve plunger through the first inlet-outlet port.

14. The check valve device according to claim 13, wherein, when the check valve device is located in the first position, the amount of gas flowing between the first male seat and the first female seat is a quantity that is greater than a quantity flowing through the first axial passage, the first orifice hole and the first crosswise passage.

15. The check valve device according to claim 13, wherein, when the check valve device is located in the second position, the amount of gas flowing between the second male seat and the second female seat is a quantity that is greater than a quantity flowing through the second axial passage, the second orifice hole and the second crosswise passage.

16. The check valve device according to claim 12, wherein the orifice hole has a predetermined cross section that limits a flow of regeneration oxygen.

17. The check valve device according to claim 12, wherein the corresponding shape of the at least one female seat and the at least one male seat is selected from a group of shapes selected from a cone shape and a tapered shape.

18. The check valve device according to claim 12, wherein the axial passage, the crosswise passage, and the orifice hole of each said at least one check valve plunger is formed when each said at least one check valve plunger is molded, drilled or a combination thereof.

19. The check valve device according to claim 12, wherein the orifice hole of each said at least one check valve plunger has a cross section sized to calibrate and limit an amount of compressed air that flows through the at least one check valve plunger.

20. The check valve device according to claim 12, wherein the at least two inlet-outlet ports of the header include a first inlet-outlet port and a second inlet-outlet port, the first inlet-outlet port, the second inlet-outlet port, and the outlet port are located in a surface of the header selected from a group consisting of a same surface, and at least two different surfaces.

* * * * *